United States Patent
Ali

(10) Patent No.: US 8,031,956 B2
(45) Date of Patent: Oct. 4, 2011

(54) ENHANCING VIDEO SHARPNESS AND CONTRAST BY LUMINANCE AND CHROMINANCE TRANSIENT IMPROVEMENT

(75) Inventor: Walid S. Ali, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 12/688,955

(22) Filed: Jan. 18, 2010

(65) Prior Publication Data

US 2010/0177249 A1     Jul. 15, 2010

Related U.S. Application Data

(63) Continuation of application No. 11/157,335, filed on Jun. 20, 2005, now Pat. No. 7,676,103.

(51) Int. Cl.
*G06K 9/36* (2006.01)

(52) U.S. Cl. ...................................................... 382/240

(58) Field of Classification Search .......... 382/232–233, 382/240, 248, 254, 266; 348/384.1, 395.1, 348/403.1–405.1, 408.1; 375/240.11, 240.19; 708/317, 400–401
See application file for complete search history.

(56) References Cited

U.S. PATENT DOCUMENTS

| | | | |
|---|---|---|---|
| 5,717,789 A | 2/1998 | Anderson et al. | |
| 6,005,983 A | 12/1999 | Anderson et al. | |
| 6,151,415 A | 11/2000 | Acharya et al. | |
| 6,574,374 B1 | 6/2003 | Acharya | |
| 6,611,627 B1 | 8/2003 | LaRossa et al. | |
| 6,640,016 B1 | 10/2003 | Ito | |
| 6,801,339 B1 | 10/2004 | Ito | |
| 7,206,459 B2 | 4/2007 | Berkner et al. | |
| 7,257,273 B2 | 8/2007 | Li et al. | |
| 7,260,266 B2 | 8/2007 | Nakajima et al. | |
| 7,308,152 B2 | 12/2007 | Ito | |
| 7,315,655 B2 | 1/2008 | Zurov et al. | |
| 7,324,687 B2 | 1/2008 | Zitnick, III et al. | |
| 7,676,103 B2 * | 3/2010 | Ali ................................ 382/240 |
| 2005/0129319 A1 | 6/2005 | Lee et al. | |
| 2006/0285767 A1 | 12/2006 | Ali | |

FOREIGN PATENT DOCUMENTS

| | | |
|---|---|---|
| CN | 1427617 | 7/2003 |
| KR | 2001-0093824 | 10/2001 |
| KR | 2005-0056671 | 6/2005 |
| WO | 2007002309 A2 | 1/2007 |
| WO | 2007002309 A3 | 1/2007 |

OTHER PUBLICATIONS

Jung, C. R., et al., "Adaptive image denoising and edge enhancement in scale-space using the wavelet transform", Pattern recognition letters, North-Holland Publ. Amsterdam, NL, 24(7), (Apr. 2003), 965-971.

(Continued)

*Primary Examiner* — Jose Couso
(74) *Attorney, Agent, or Firm* — Kacvinsky Daisak PLLC

(57) ABSTRACT

An apparatus, system, method, and article for enhancing video sharpness are described. The apparatus may include a media processing node to enhance sharpness of an input image. The media processing node may include a wavelet decomposition module to perform wavelet decomposition of the input image to detect and modify edge information. Other embodiments are described and claimed.

25 Claims, 6 Drawing Sheets

OTHER PUBLICATIONS

Kim, Y. S., et al., "Improvement of ultrasound image based on wavelet transform: speckle reduction and edge enhancement", Proceedings of the SPIE—The International socieity for optical engineering SPIE-Int. Soc. Opt. ENG USA, 5747(1), (Feb. 17, 2005),1085-1092.

Tsai, Du-Yih et al., "A method of medical image enhancement using Wavelet-coefficient mapping functions", Neural Network and Signal Processing, 2003. Proceedings of the 2003 International conference on Nanjing, China Dec. 14-17, 2003, Piscataway, NJ, USA, IEEE, 2, (Dec. 14, 2003),1091-1094.

Wang, H. et al., "Mammogram Feature Analysis System using DAF Wavelet", Proceedings of the SPIE—The International socieity for optical engineering SPIE-Int. soc. opt. ENG USA, 4041, (2000),14-24.

Capodiferro, L. et al., "Non-linear image enhancement in the space scale domain", Signal processing X theories and application. Proceedings of EUSIPCO 2000. Tenth European signal processing conference tampere Univ. technology tampere, Finland, 1, (2000), 311-313.

* cited by examiner

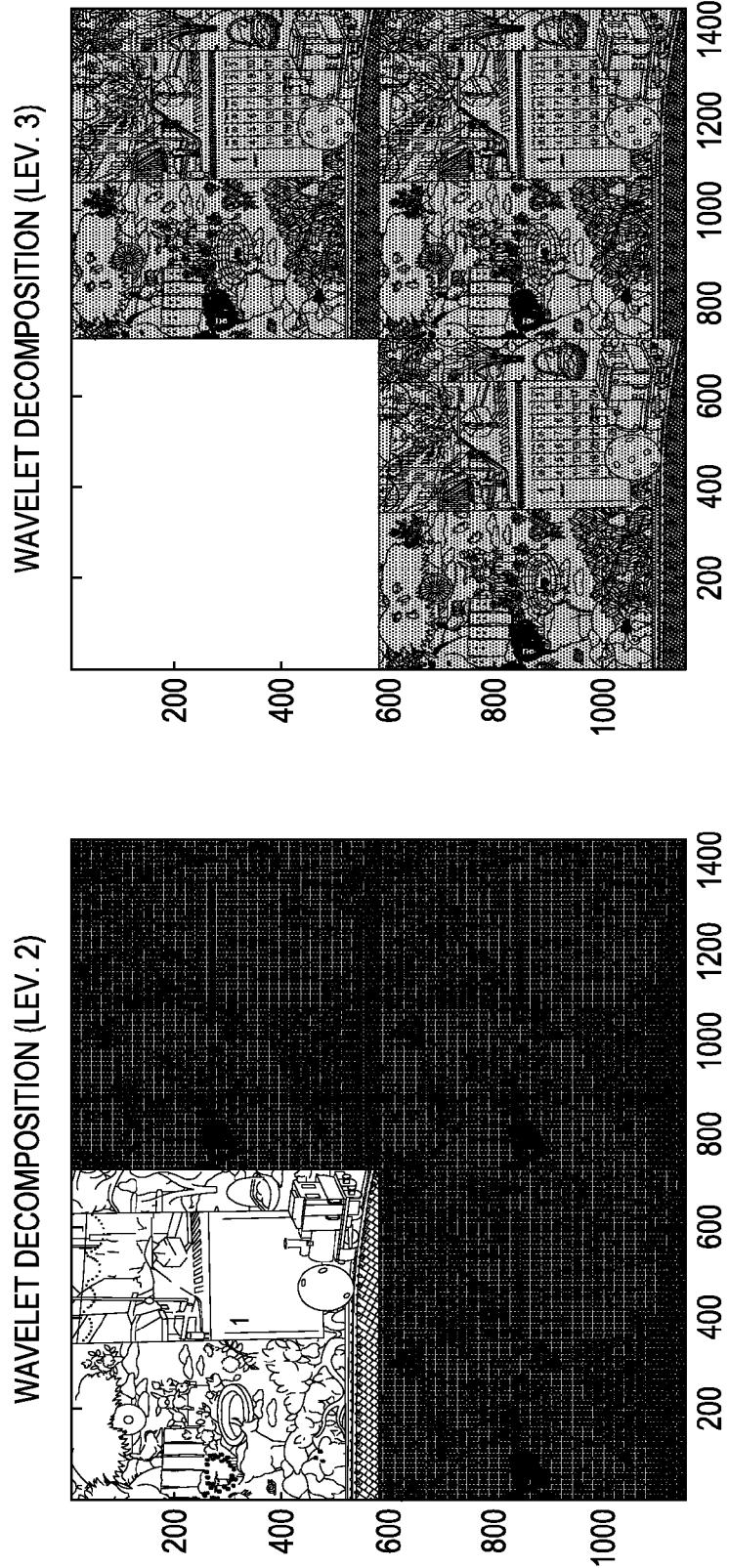

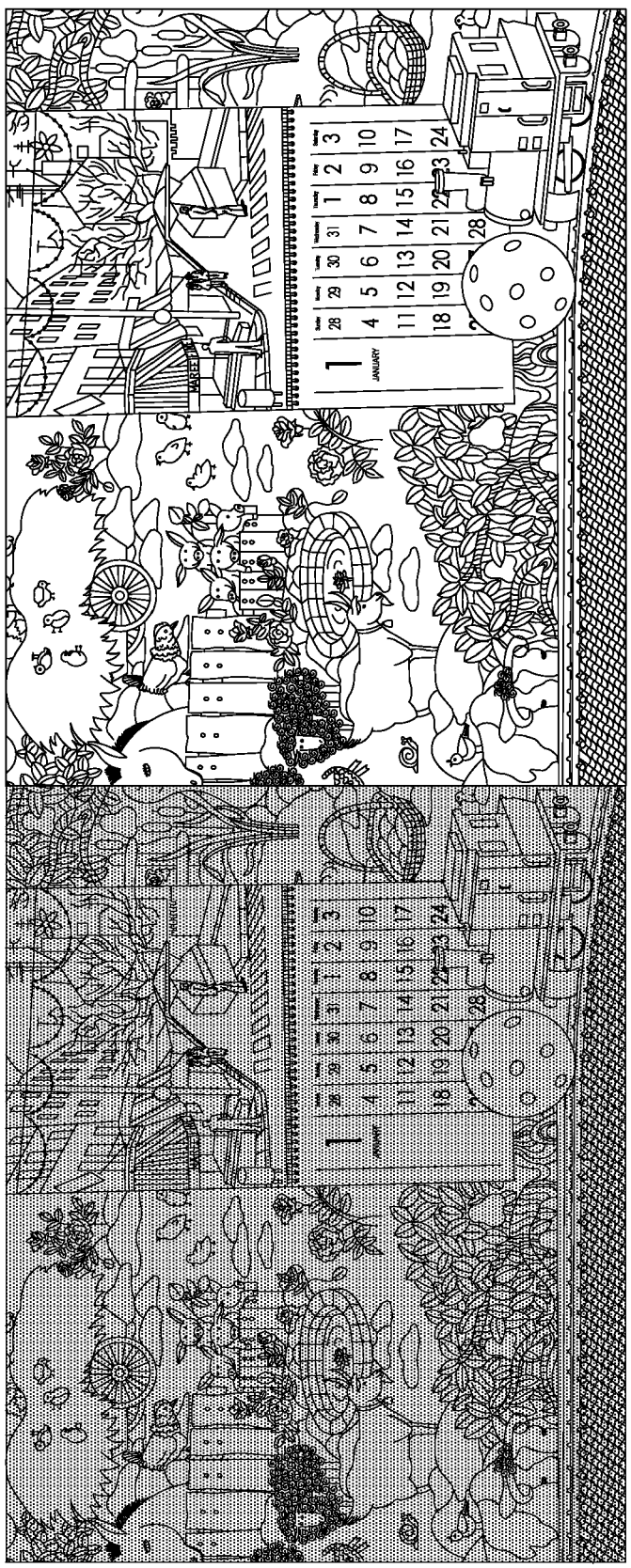
FIG. 6A ORIGINAL IMAGE
FIG. 6B PROCESSED IMAGE

ENHANCING VIDEO SHARPNESS AND CONTRAST BY LUMINANCE AND CHROMINANCE TRANSIENT IMPROVEMENT

BACKGROUND

Sharpness is a perceptual feature, which is determined by the human visual system. While the human eye is more sensitive to the sharpness of the luminance signal than to that of the chrominance, higher resolution images such as high definition television (HDTV) images, require the co-joint enhancement of both the luminance (black and white) and the chrominance sharpness. In color television broadcasting standards, such as National Television System Committee (NTSC) and Phase Alteration by Line (PAL), for example, the limited bandwidth of the chrominance and the luminance signals produces relatively slow transitions, causing smeared edges in the received images.

Various methods for sharpness enhancement have used edge transition to better improve the picture quality, but either lacked adaptability to the picture contents, degraded with noisy sequences and/or required complex hardware. Even though improving the edge transitions results in an improved overall sharpness, the lack of adaptability to the picture contents produces irritating artifacts and reduces the overall impression of sharpness improvement.

BRIEF DESCRIPTION OF THE DRAWINGS

FIG. 6 illustrates one embodiment of a processed image.

DETAILED DESCRIPTION

Figure 1:
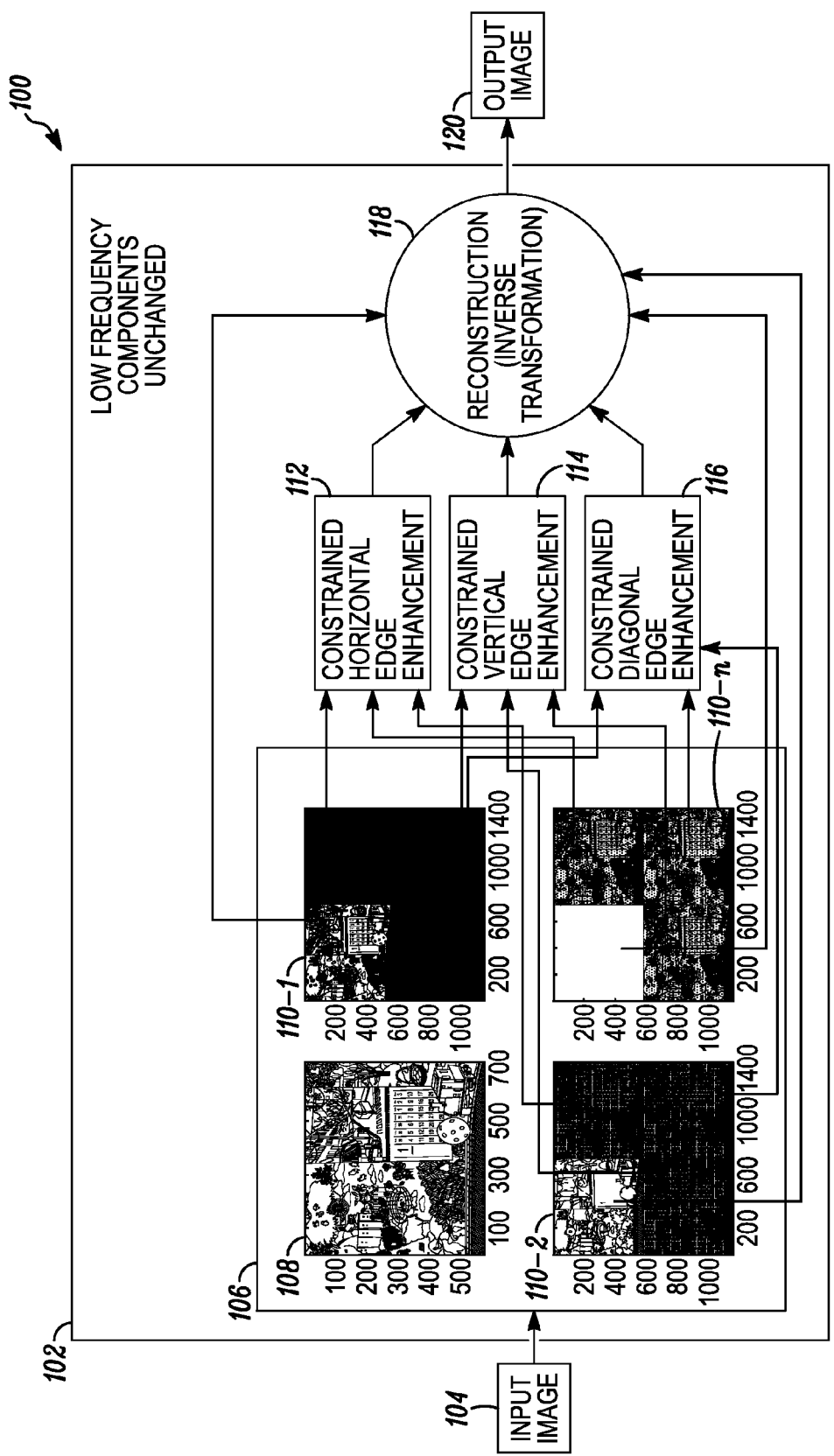
FIG. 1 illustrates one embodiment of a system.

FIG. 1 illustrates one embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

In various embodiments, the communications system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as NTSC, PAL, MPEG-1, MPEG-2, MPEG-4, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003. The embodiments are not limited in this context.

As shown in FIG. 1, the communications system 100 may comprise a media processing node 102. In various embodiments, the media processing node 102 may comprise, or be implemented as, one or more of a processing system, a processing sub-system, a processor, a computer, a device, an encoder, a decoder, a coder/decoder (CODEC), a filtering device (e.g., graphic scaling device, deblocking filtering device), a transformation device, an entertainment system, a display, or any other processing architecture. The embodiments are not limited in this context.

In various embodiments, the media processing node 102 may be arranged to process one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The embodiments are not limited in this context.

In various embodiments, media processing node 102 may be arranged to process media information received from a media source node 104. The media source node 104 may comprise any media source capable of delivering media information such as image information, video information, and/or audio/video (A/V) information. An example of a media source may include a source for video signals, such as from a computer to a display. Another example of a media source may include a source for A/V signals such as television signals. The media source may be arranged to source or deliver standard analog television signals, digital television signals, HDTV signals, and so forth. The television signals may include various types of information, such as television audio information, television video information, and television control information. The television video information may include content from a video program, computer generated images (CGI), and so forth. The television audio information may include voices, music, sound effects, and so forth. The television control information may be embedded control signals to display the television video and/or audio information, commercial breaks, refresh rates, synchronization signals, and so forth. The embodiments are not limited in this context.

In some embodiments, the media source node 104 may include a device arranged to deliver pre-recorded media stored in various formats, such as a Digital Video Disc (DVD) device, a Video Home System (VHS) device, a digital VHS device, a digital camera, A/V camcorder, a gaming console, a Compact Disc (CD) player, and so forth. In yet another example, the media source node 104 may include media distribution systems to provide broadcast or streaming analog or digital television or audio signals to media processing node 102. Examples of media distribution systems may include, for example, Over The Air (OTA) broadcast systems, terrestrial cable systems (CATV), satellite broadcast systems, and so forth. The types and locations of the media source node 104 are not limited in this context.

In various embodiments, the media processing node 102 may be arranged to receive an input image. The input image may comprise any data derived from or associated with one or more video images. In one embodiment, for example, the input image may comprise a picture in a video sequence comprising signals (e.g., Y, U, and V) sampled in both the horizontal and vertical directions. In various embodiments, the input image may comprise one or more of image data, video data, video sequences, groups of pictures, pictures, images, regions, objects, frames, slices, macroblocks, blocks, pixels, signals, and so forth. The values assigned to pixels may comprise real numbers and/or integer numbers.

In various embodiments, the media processing node 102 may be arranged to perform sharpness enhancement on the received input image. The media processing node 102 may perform adaptive sharpness enhancement using luminance transient improvement and chrominance transient improvement (LTI/CTI), for example. In various implementations, the media processing node 102 may perform LTI/CTI processing to enhance perceived sharpness by decomposing edge information via a wavelet filter bank and adaptively changing the frequency-amplitude distribution for the edges. The LTI/CTI processing may comprise real time video sharpness enhancement, which adaptively sharpens a picture by improving the edge transitions (e.g., variable edge enhancement at different parts of the image) using wavelet transforms. The LTI/CTI processing may result in a significant enhancement of the perceived sharpness while avoiding the introduction of artifacts. The embodiments are not limited in this context.

Figure 2:
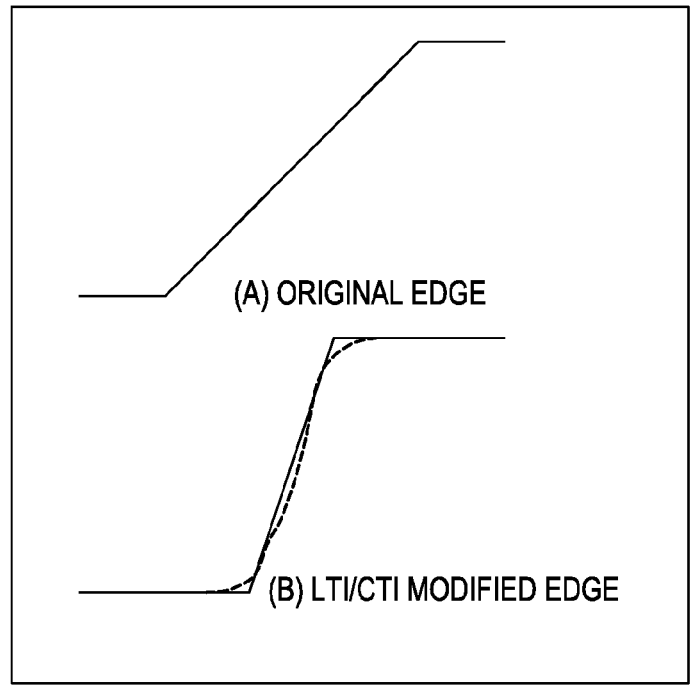
FIG. 2 illustrates one embodiment of sharpness enhancement.

FIG. 2 illustrates one embodiment of sharpness enhancement. FIG. 2 illustrates one embodiment of sharpness enhancement using LTI/CTI processing. In various embodiments, the LTI/CTI processing may be performed a system (e.g., communications system 100) and/or by a node (e.g., media processing node 102). The embodiments are not limited in this context.

As shown in FIG. 2, the sharpness of an original edge (a) may be enhanced to an LTI/CTI modified edge (b). When a picture is completely plain, all sample values are substantially equal. The original edge (a) illustrates that when an edge (e.g., horizontal edge) exists, the sample values in the horizontal direction undergo an abrupt change. As shown by the LTI/CTI modified edge (b), LTI/CTI processing may make edges sharper by making them steeper or increasing the slope. The embodiments are not limited in this context.

In various embodiments, LTI/CTI processing may comprise detecting a transition, calculating the length of the transition (e.g., number of samples needed to achieve the transition corresponding to an edge), and changing the distribution of the transition. For example, LTI/CTI processing may comprise tracing pixel values in a certain direction to detect the transition and calculating the steepness or slope of the edge. In various implementations, sharpness may be improved by changing the pixel values (e.g., frequency components) to change edge steepness. The embodiments are not limited in this context.

Referring again to FIG. 1, the media processing node 102 may comprise multiple modules. The modules may comprise, or be implemented as, one or more systems, sub-systems, processors, devices, machines, tools, components, circuits, registers, applications, programs, subroutines, or any combination thereof, as desired for a given set of design or performance constraints. In various embodiments, the modules may be connected by one or more communications media. Communications media generally may comprise any medium capable of carrying information signals. For example, communication media may comprise wired communication media, wireless communication media, or a combination of both, as desired for a given implementation. The embodiments are not limited in this context.

The modules may comprise memory which may be implemented as any computer-readable storage media capable of storing data, including both volatile and non-volatile memory. Examples of storage media include random-access memory (RAM), dynamic RAM (DRAM), Double-Data-Rate DRAM (DDRAM), synchronous DRAM (SDRAM), flash memory, ROM, programmable ROM (PROM), erasable programmable ROM (EPROM), electrically erasable programmable ROM (EEPROM), flash memory, content addressable memory (CAM), polymer memory (e.g., ferroelectric polymer memory, ovonic memory, phase change or ferroelectric memory), silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information. The storage media may contain various combinations of machine-readable storage devices and/or various controllers to store computer program instructions and data. The embodiments are not limited in this context.

The media processing node 102 may comprise a wavelet decomposition module 106. In various embodiments, the decomposition module 106 may be arranged to receive an input image. The input image may comprise, for example, a picture in a video sequence comprising signals (e.g., Y, U, and V) sampled in both the horizontal and vertical directions. The embodiments are not limited in this context.

In various implementations, the wavelet decomposition module 106 may be arranged to perform wavelet decomposition. The wavelet decomposition may comprise two-dimensional orthogonal wavelet decomposition, for example. The wavelet decomposition may automatically detect edge information in any general direction in the signal components (e.g., YUV or RGB). It can be appreciated that various wavelet decompositions may be used. The embodiments are not limited in this context.

In various implementations, wavelet decomposition may comprise determining the location of the edges as well as making the edges steeper by modifying the constituent frequency components. The wavelet decomposition may comprise performing wavelet analysis for edge detection and/or transient processes. The edge information may be decomposed via a wavelet filter bank, for example, and the frequency-amplitude distribution for the edges may be adaptively changed. The wavelets may comprise time aspects and scale or space aspects, which enable analysis in both time and space for any physical phenomenon. Wavelet analysis may comprise a windowing technique with variable-sized regions. Wavelet analysis may allow the use of long time intervals where more precise low-frequency information is desired, and the use of shorter regions where high-frequency information is desired. The embodiments are not limited in this context.

The wavelet decomposition may comprise employing a wavelet transform. In various embodiments, the wavelet transform may comprise a discrete wavelet transform (DWT) such as a Debauchies wavelet transform, for example. In various implementations, the wavelet transform may use dyadic scales and positions following a geometric sequence of ratio two in order to reduce the amount of wavelet coefficient calculations. The dyadic wavelet transform improves efficiency and generally is just as accurate. The embodiments are not limited in this context.

In various embodiments, the wavelet decomposition may comprise performing multiple levels of decomposition. In one embodiment, for example, the wavelet decomposition may comprise three levels of decomposition. The embodiments are not limited in this context.

Figure 3:
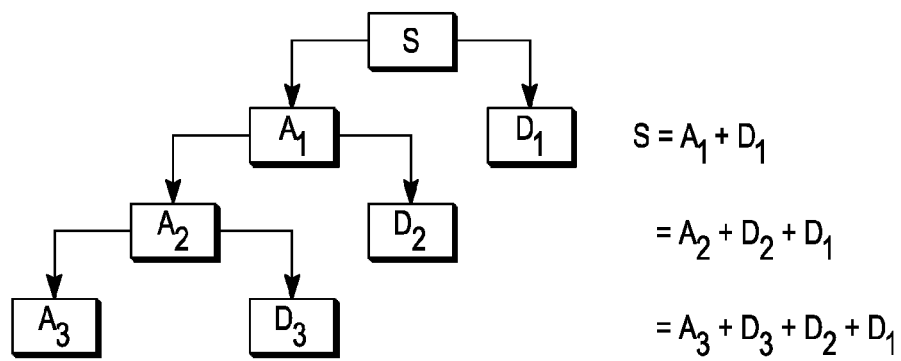
FIG. 3 illustrates one embodiment of wavelet decomposition.

FIG. 3 illustrates one embodiment of wavelet decomposition. FIG. 3 illustrates one embodiment of multi-level wavelet decomposition. In various implementations, employing a wavelet transform such as a DWT allows decomposition of a signal (S) into a low-detail component (A1) and a high-detail component (D1) in horizontal, vertical and diagonal directions. The approximation and detail analysis may be duplicated at multiple levels. For example, the DWT may be applied recursively on the low detail component (A1) into another low detail component (A2) and another level of high-detail component (D2) in horizontal, vertical and diagonal directions. Recursive application may be performed for multiple levels of decomposition according the following equation:

$$S = A_1 + D_1 = A_2 + D_2 + D_1 = A_3 + D_3 + D_2 + D_1 \quad (1),$$

where S is the original image, $A_i$ and $D_i$ are the ith level approximation and details decomposition. This equation could be more generally written as:

$$S = A_i + \sum_{j<i} D_j \quad (2)$$

Figure 4B:
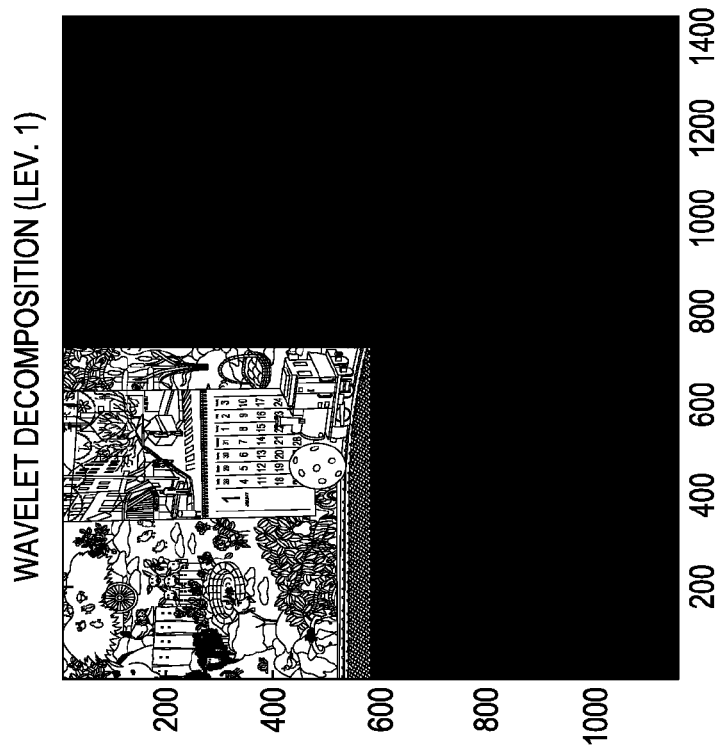
FIG. 4 illustrates one embodiment of wavelet decomposition output.
Figure 4A:
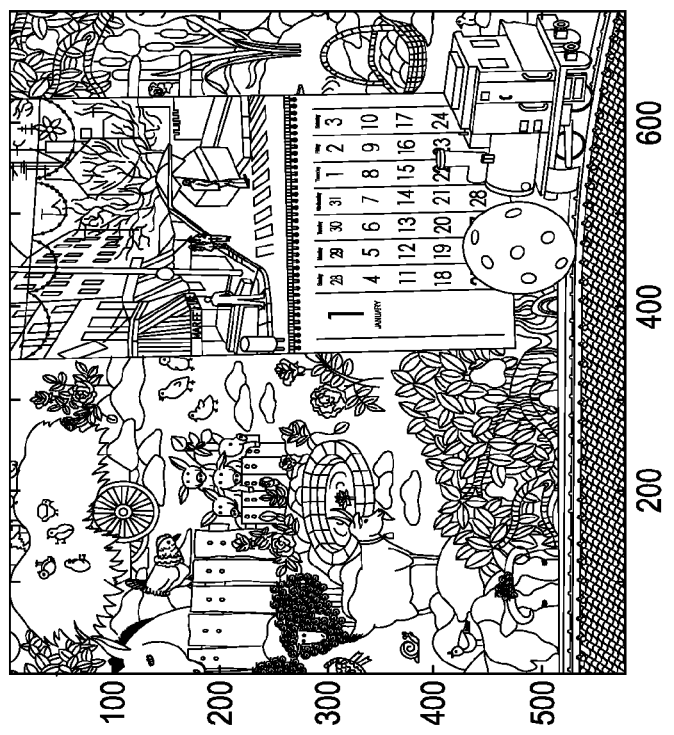

FIG. 4 illustrates one embodiment of wavelet decomposition output. FIG. 4 illustrates one embodiment of output from a wavelet decomposition comprising a three-level, two-dimensional wavelet decomposition of a luminance signal. In various embodiments, images may comprise 2-dimensional signals (x and y direction). Performing wavelet decomposition by applying a three-level, two-dimensional DWT (2D-DWT) to an original image (a) may generate a first level approximation and details (b), a second level approximation and details (c), and a third level approximation and details (d). The embodiments are not limited in this context.

Referring again to FIG. 1, the wavelet decomposition module 106 may arranged to perform wavelet decomposition on an original image 108. In various embodiments, the wavelet decomposition module 106 may perform a three-level, two-dimensional wavelet decomposition (e.g., 2D-DWT) to generate a first level approximation and details 110-1, a second level approximation and details 110-2, and a third level approximation and details 110-3. The embodiments are not limited in this context.

The media processing node 102 may comprise one or more edge enhancement modules, such as a horizontal edge enhancement module 112, a vertical edge enhancement module, and a diagonal edge enhancement module 116. In various embodiments, the horizontal edge enhancement module 112, the vertical edge enhancement module, and the diagonal edge enhancement module 116 may be arranged to change to the decomposition output (e.g., 2D-DWT output). In various implementations, horizontal, vertical and diagonal enhancement may be applied only to the detail component (high frequency) of the wavelet decomposition, while the approximation component (low frequency) of every level of wavelet decomposition may be passed without any enhancement, to further ensure the sharpness enhancement method does not respond to the low frequency components in the image, but rather to the mid and high frequency components. The embodiments are not limited in this context.

In various embodiments, the horizontal edge enhancement module 112, the vertical edge enhancement module, and the diagonal edge enhancement module 116 may be arranged to pad higher frequency components with more components, which fit the decomposed components. The different decomposition levels may be treated differently (soft threshold), based on the relative amount of energy in every decomposition level. In various implementations, the 2D-DWT decomposition may be modified by boosting the high frequency components in the horizontal, vertical and diagonal directions at the first level with a factor t1, at the second level with a factor t2, and at the third level with a factor t3, where t1>t2>t3. The embodiments are not limited in this context.

In various implementations, the horizontal edge enhancement module 112 may boost the high frequency components from the first level approximation and details 110-1 in the horizontal direction by a first enhancement factor $t_h1$. The horizontal edge enhancement module 112 may boost the high frequency components from the second level approximation and details 110-2 in the horizontal direction by a second enhancement factor $t_h2$. The horizontal edge enhancement module 112 may boost the high frequency components from the third level approximation and details 110-3 in the horizontal direction by a third enhancement factor $t_h3$ ($t_h1>t_h2>t_h3$). The embodiments are not limited in this context.

In various implementations, the vertical edge enhancement module 114 may boost the high frequency components from the first level approximation and details 110-1 in the vertical direction by a first enhancement factor $t_v1$. The vertical edge enhancement module 114 may boost the high frequency components from the second level approximation and details 110-2 in the vertical direction by a second enhancement factor $t_v2$. The vertical edge enhancement module 114 may boost the high frequency components from the third level approximation and details 110-3 in the vertical direction by a third enhancement factor $t_v3$ ($t_v1 > t_v2 > t_v3$). The embodiments are not limited in this context.

In various implementations, the diagonal edge enhancement module 116 may boost the high frequency components from the first level approximation and details 110-1 in the diagonal direction by a first enhancement factor $t_d1$. The diagonal edge enhancement module 116 may boost the high frequency components from the second level approximation and details 110-2 in the diagonal direction by a second enhancement factor $t_d2$. The diagonal edge enhancement module 116 may boost the high frequency components from the third level approximation and details 110-3 in the diagonal direction by a third enhancement factor $t_d3$ ($t_d1 > t_d2 > t_d3$). The embodiments are not limited in this context.

The media processing node 102 may comprise a reconstruction module 118. In various embodiments, the reconstruction module 118 may be arranged to perform reconstruction using the modified decomposition levels. In various implementations, the reconstruction module 118 may receive the enhanced horizontal, vertical and diagonal detail component of the wavelet decomposition from the horizontal edge enhancement module 112, the vertical edge enhancement module, and the diagonal edge enhancement module 116. The reconstruction module 118 may received the approximation component (low frequency) of every level of wavelet decomposition without enhancement from the wavelet decomposition module 106. In various implementations, the reconstruction module 118 may use the modified frequency components of the luma and chorma (YUV signals) and perform inverse transformation to obtain every image back from the wavelet transforms. The embodiments are not limited in this context.

In some cases, if the edge information is weak, weak real signals may be confused with noise. In various implementations, a local noise measurement technique may be used to adaptively decide on the local threshold for noise presence to remedy this situation. The local noise measurement technique may adaptively determine a coring value based on the picture contents. The coring value may be set to a very low percentage of the input signal (YU or V), depending on the picture characteristics. In various implementations, the coring value may be set to 2-4% so that almost 96% of the original values are excluded (assuming a valid Gaussian assumption) to hypothesize the coring threshold in an image. The coring value may be used locally at every decomposition level to measure the level of noise and to give a localized measure both in the time domain (the image itself) and in the frequency domain (every decomposition level). The embodiments are not limited in this context.

In various embodiments, the media processing node 102 may be arranged to provide an output image to a media destination node 120. The media destination node 120 may comprise any media destination capable of receiving media information such as image information, video information, and/or A/V information. In various embodiments, the media processing node 102 may comprise, or be implemented as, one or more of a system, a sub-system, a processor, a computer, a device, an entertainment system, a display, or any other architecture. The embodiments are not limited in this context.

Operations for various embodiments may be further described with reference to the following figures and accompanying examples. Some of the figures may include a logic flow. It can be appreciated that the logic flow merely provides one example of how the described functionality may be implemented. Further, the given logic flow does not necessarily have to be executed in the order presented unless otherwise indicated. In addition, the logic flow may be implemented by a hardware element, a software element executed by a processor, or any combination thereof. The embodiments are not limited in this context.

Figure 5:
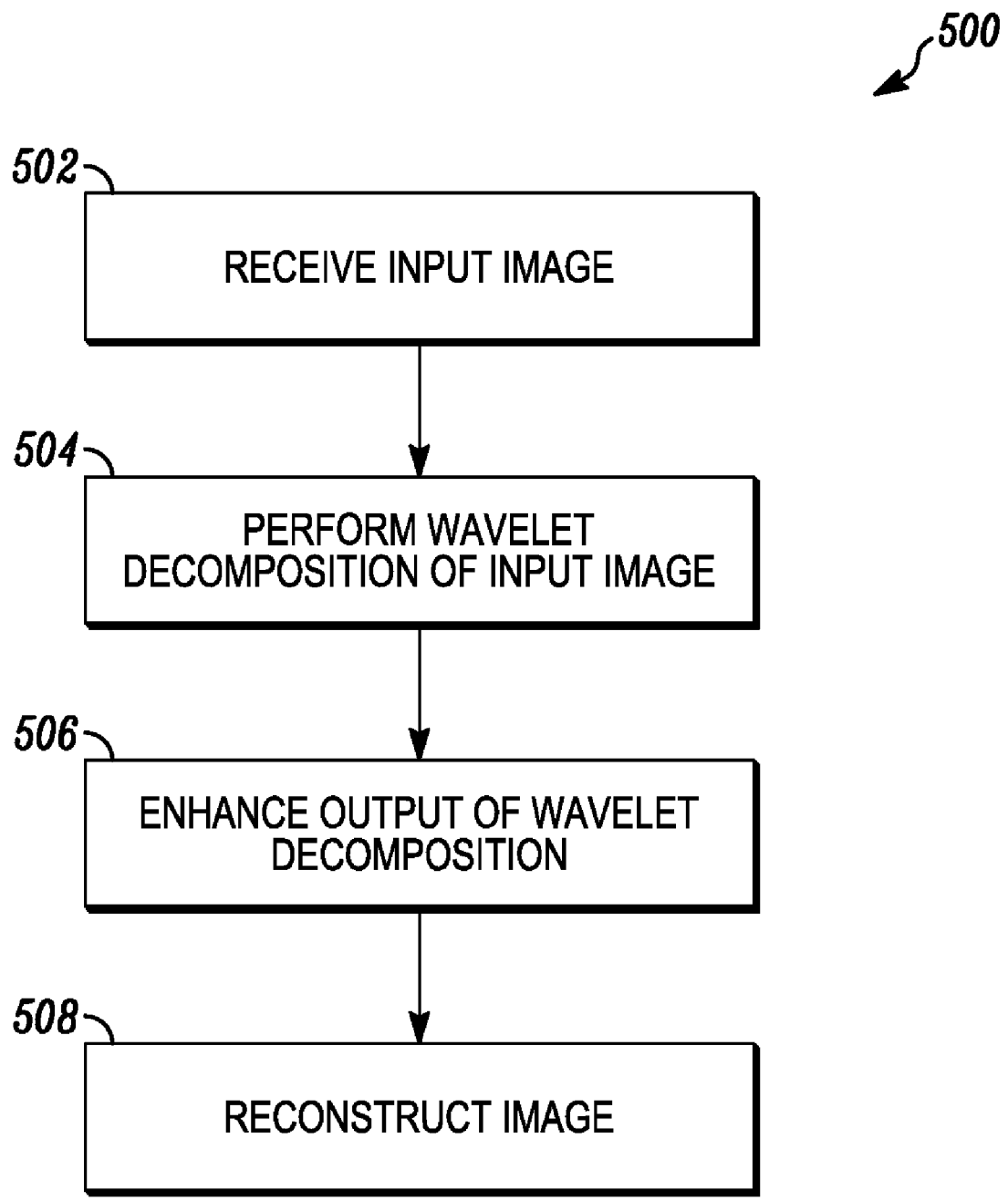
FIG. 5 illustrates one embodiment of a logic flow.

FIG. 5 illustrates one embodiment of a logic flow 500. FIG. 5 illustrates logic flow 500 for performing sharpness enhancement. In various embodiments, the logic flow 500 may be performed by system (e.g., communications system 100) and/or a node (e.g., media processing node 102). It is to be understood that the logic flow 500 may be implemented by various other types of hardware, software, and/or combination thereof. The embodiments are not limited in this context.

The logic flow 500 may comprise receiving an input image (block 502). In various embodiments, the input image may comprise a picture in a video sequence comprising signals (e.g., Y, U, and V) sampled in both the horizontal and vertical directions. The embodiments are not limited in this context.

The logic flow 500 may comprise performing wavelet decomposition on the input image (block 504). In various embodiments, wavelet decomposition may comprise two-dimensional orthogonal wavelet decomposition. In implementations, performing wavelet decomposition may comprise performing multiple levels of decomposition. The wavelet decomposition may automatically detect edge information in any general direction in the signal components (e.g., YUV or RGB). The wavelet decomposition may determine the location of the edges as well as making the edges steeper by modifying the constituent frequency components. The wavelet decomposition may comprise employing a wavelet transform (e.g., DWT). The embodiments are not limited in this context.

The logic flow 500 may comprise enhancing the output of the wavelet decomposition (block 506). In various embodiments, horizontal, vertical and diagonal enhancement may be applied to the detail component (high frequency) of the wavelet decomposition. In various implementations, higher frequency components are padded with more components, which fit the decomposed components. Different decomposition levels may be treated differently (soft threshold), based on the relative amount of energy in every decomposition level. In various implementations, the output of the wavelet decomposition may be enhanced by boosting the high frequency components in the horizontal, vertical and diagonal directions at a first decomposition level with a factor $t1$, at a second decomposition level with a factor $t2$, and a third decomposition level with a factor $t3$, where $t1 > t2 > t3$. The embodiments are not limited in this context.

The logic flow 500 may comprise reconstructing the image (block 508). In various embodiments, reconstruction may be performed using the modified decomposition levels. In various implementations, reconstruction may be performed using the enhanced horizontal, vertical and diagonal detail component of the wavelet decomposition and the approximation component (low frequency) of every level of wavelet decomposition without enhancement. Reconstruction may comprise performing inverse transformation to obtain every image back from the wavelet transforms. The embodiments are not limited in this context.

FIG. 6 illustrates one embodiment of a processed image. As shown, the sharpness of an original image (a) has been enhanced without the introduction of added artifacts. The embodiments are not limited in this context.

In various implementations, the described embodiments may improve the overall sharpness impression by LTI/CTI using wavelet transforms and reconstruction while avoiding noise and artifact amplification. Picture quality may be improved by boosting the perceived sharpness while not suffering from any artifacts such as aliasing, jitter or clipping. Sharpness may be enhanced for various video sequences (e.g., interlaced/progressive, blocky/block-free, noisy/noise-free) and contents (e.g., high motion contents, human and skin-rich subjects, natural and synthetic contents). Even with the presences of noise, the overall perceived sharpness may be improved without amplifying the noise beyond its original level. The embodiments are not limited in this context.

In various implementations, the described embodiments may utilize the two dimensional wavelet decomposition of only the current image (the picture under consideration for enhancement). The beginning and the end of an edge may be determined accurately from one frame. As such, significantly less memory may be required. The described embodiments may adapt thresholds and decomposition decisions to the contents of the current image under consideration. The embodiments are not limited in this context.

In various implementations, the described embodiments may inherently detect edges in all directions without hypothesizing on both the edge direction (e.g., vertical or horizontal) as well as the window of support (the number of pixels over which the transition is assumed to have taken place). The described embodiment may be transparent to such requirements and make no prior assumptions to the picture contents. As no prior assumptions of edge directions are made, the described embodiments are thus effective in sharpness improvement when applied to HDTV signals even if an HDTV's original source has been a lower resolution image (e.g. SD). The embodiments are not limited in this context.

In various implementations, the described embodiments may perform wavelet analysis. Wavelet analysis may provide advantages over Fourier analysis, which breaks down a signal into constituent sinusoids of different frequencies. For example, when looking at a Fourier transform of a signal, it is impossible to tell when a particular event took place. This is a major drawback since almost all natural signals are non-stationary signals having time varying statistical characteristics. The Short-Time FourierTransform (STFT) overcomes shortcomings of regular Fourier transforms by mapping a signal into a two-dimensional function of time and frequency. Yet, such approach suffers from low precision since once a particular size is chosen for a time window, that window is the same for all frequencies.

In various implementations, the described embodiments may achieve better results than peaking. While LTI/CTI improves the perceived sharpness by adding frequency components to the transitions, peaking enhances the perceived image sharpness by amplifying the high frequency components' amplitude. In other words, the bandwidth and the frequency components in the signal are changed after LTI/CTI, while for peaking, no new frequency components are generated. Peaking basically boosts the higher spatial frequency components by adding the first or the second derivative, which is obtained by convolving the image with a Laplacian kernel, while avoiding overflow (clipping prevention) and/or susceptibility to noise (coring prevention). Peaking re-emphasizes the over/undershoots of the luminance signal, by adding the signal's first or second derivative to itself.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In various implementations, the described embodiments may comprise, or form part of a wired communication system, a wireless communication system, or a combination of both. Although certain embodiments may be illustrated using a particular communications media by way of example, it may be appreciated that the principles and techniques discussed herein may be implemented using various communication media and accompanying technology.

In various implementations, the described embodiments may be arranged to communicate information wired or wireless communications media. Examples of wired communications media may include a wire, cable, printed circuit board (PCB), backplane, switch fabric, semiconductor material, twisted-pair wire, co-axial cable, fiber optics, and so forth. An example of a wireless communication media may include portions of a wireless spectrum, such as the radio-frequency (RF) spectrum. In such implementations, the described embodiments may include components and interfaces suitable for communicating information signals over the designated wireless spectrum, such as one or more antennas, transmitters, receivers, transceivers, amplifiers, filters, control logic, and so forth. The embodiments are not limited in this context.

In various embodiments, communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth. The embodiments are not limited in this context.

In various implementations, the described embodiments may comprise or form part of a network, such as a Wide Area Network (WAN), a Local Area Network (LAN), a Metropolitan Area Network (MAN), the Internet, the World Wide Web, a telephone network, a radio network, a television network, a cable network, a satellite network, a wireless personal area network (WPAN), a wireless WAN (WWAN), a wireless LAN (WLAN), a wireless MAN (WMAN), a Code Division Multiple Access (CDMA) cellular radiotelephone communication network, a third generation (3G) network such as Wide-band CDMA (WCDMA), a fourth generation (4G) network, a Time Division Multiple Access (TDMA) network, an Extended-TDMA (E-TDMA) cellular radiotelephone network, a Global System for Mobile Communications (GSM) cellular radiotelephone network, a North American Digital Cellular (NADC) cellular radiotelephone network, a universal mobile telephone system (UMTS) network, and/or any other wired or wireless communications network configured to carry data. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk ROM (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, DSP, and so forth. In yet another example, an embodiment may be implemented by any combination of programmed general-purpose computer components and custom hardware components. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a processor; and
a media processing node arranged to enhance sharpness of an input image using said processor, said media processing node comprising:
a receiver to receive the input image;
a wavelet decomposition module to perform multiple levels of wavelet decomposition of said input image by performing wavelet analysis for edge detection using a wavelet transform, said wavelet analysis comprising a windowing technique with variable-sized time regions; and
an edge enhancement module to perform horizontal, vertical, and diagonal enhancement on high frequency components of wavelet decomposition output from said wavelet decomposition module.

2. The apparatus of claim 1, wherein the input image comprises time aspects and scale aspects.

3. The apparatus of claim 2, wherein said windowing technique comprises longer time intervals for low-frequency information and shorter time intervals for high-frequency information.

4. The apparatus of claim 1, wherein the wavelet transform comprises a dyadic wavelet transform.

5. The apparatus of claim 1, wherein the wavelet transform is applied recursively for the multiple levels of wavelet decomposition.

6. The apparatus of claim 1, wherein said edge enhancement module performs the enhancement based on a relative amount of energy in each level of decomposition.

7. The apparatus of claim 6, wherein said edge enhancement module enhances said high frequency components by boosting said high frequency components according to boosting factors based on the relative amount of energy in each level of decomposition.

8. A system, comprising:
a source node;
a processor; and
a media processing node to couple to said source node and arranged to enhance sharpness of an input image using said processor, said media processing node comprising:
a receiver to receive an input image;
a wavelet decomposition module to perform multiple levels of wavelet decomposition of said input image, by performing wavelet analysis for edge detection using a wavelet transform, said wavelet analysis comprising a windowing technique with variable-sized time regions; and
an edge enhancement module to perform horizontal, vertical, and diagonal enhancement on high frequency components of wavelet decomposition output from said wavelet decomposition module.

9. The system of claim 8, wherein the input image comprises time aspects and scale aspects.

10. The system of claim 9, wherein said windowing technique comprises longer time intervals for low-frequency information and shorter time intervals for high-frequency information.

11. The system of claim 8, wherein the wavelet transform comprises a dyadic wavelet transform.

12. The system of claim 8, wherein the wavelet transform is applied recursively for the multiple levels of wavelet decomposition.

13. The system of claim 8, wherein said edge enhancement module performs the enhancement based on a relative amount of energy in each level of decomposition.

14. The system of claim 13, wherein said edge enhancement module enhances said high frequency components by boosting said high frequency components according to boosting factors based on the relative amount of energy in each level of decomposition.

15. A method, comprising:
receiving an input image in a computer comprising a processor;
performing multiple levels of wavelet decomposition of said input image with said processor by performing wavelet analysis for edge detection using a wavelet transform, said wavelet analysis comprising a windowing technique with variable-sized time regions; and performing horizontal, vertical, and diagonal enhancement on high frequency components of wavelet decomposition output from said wavelet decomposition module.

16. The method of claim 15, wherein the input image comprises time aspects and scale aspects.

17. The method of claim 16, wherein said windowing technique comprises longer time intervals for low-frequency information and shorter time intervals for high-frequency information.

18. The method of claim 15, wherein the wavelet transform comprises a dyadic wavelet transform.

19. The method of claim 15, wherein the wavelet transform is applied recursively for the multiple levels of wavelet decomposition.

20. The method of claim 15, wherein said edge enhancement module performs the enhancement based on a relative amount of energy in each level of decomposition.

21. The method of claim 20, wherein said edge enhancement module enhances said high frequency components by boosting said high frequency components according to boosting factors based on the relative amount of energy in each level of decomposition.

22. An article comprising a computer-readable storage medium containing instructions that when executed enable a computer to:

receive an input image;

perform multiple levels of wavelet decomposition of said input image by performing wavelet analysis for edge detection using a wavelet transform, said wavelet analysis comprising a windowing technique with variable-sized time regions; and performing horizontal, vertical, and diagonal enhancement on high frequency components of wavelet decomposition output from said wavelet decomposition module.

23. The article of claim 22, wherein the input image comprises time aspects and scale aspects.

24. The article of claim 23, wherein said windowing technique comprises longer time intervals for low-frequency information and shorter time intervals for high-frequency information.

25. The article of claim 22, wherein the wavelet transform is applied recursively for the multiple levels of wavelet decomposition.

\* \* \* \* \*